United States Patent [19]
Parvin

[11] Patent Number: 5,440,829
[45] Date of Patent: Aug. 15, 1995

[54] HOOK HOLDER

[75] Inventor: Kenneth Parvin, St. Petersburg, Fla.

[73] Assignee: Parvin Enterprises, Inc., St. Petersburg, Fla.

[21] Appl. No.: 335,128

[22] Filed: Nov. 7, 1994

[51] Int. Cl.$^6$ ............................................. A01K 97/06
[52] U.S. Cl. ............................................. 43/57.1
[58] Field of Search ............... 43/54.1, 57.1, 57.2, 43/57.3; 206/315.11; 224/920

[56] References Cited

U.S. PATENT DOCUMENTS

| | | | |
|---|---|---|---|
| 2,629,200 | 2/1953 | Woodhead | 43/57.2 |
| 2,927,395 | 3/1960 | Bartlett | 43/57.2 |
| 3,430,379 | 3/1969 | Wolfrum | 43/457.1 |
| 3,713,244 | 1/1973 | Alotta | 43/57.2 |
| 4,179,834 | 12/1979 | Thomas | 43/57.2 |
| 4,468,882 | 9/1984 | Marusak | 43/57.1 |
| 4,866,875 | 9/1989 | Bliven | 43/57.1 |
| 4,977,700 | 12/1990 | Perlman | 43/57.2 |

*Primary Examiner*—Mark Rosenbaum
*Assistant Examiner*—Jeanne M. Elpel
*Attorney, Agent, or Firm*—Pettis & McDonald

[57] ABSTRACT

A hook holder of the type primarily intended for removably retaining a fishing hook including a receiving surface with at least one opening for a hook, a retaining sheet adjacent to the hook receiving surface, and a fastener securing the retaining sheet to the receiving surface, so that a hook is held in the opening by pressure from the retaining sheet when the retaining sheet is deformed by introduction of the hook between the retaining sheet and the receiving surface.

8 Claims, 3 Drawing Sheets

HOOK HOLDER

FIELD OF THE INVENTION

This invention relates to hook holders for holding fishing hooks and more particularly for holding fishing hooks so that their points are not exposed, so that the hooks cannot be jarred loose, and so that the leader lines and swivels attached to the hooks are likewise secured and prevented from tangling with each other. This invention is particularly applicable for securing multiple fishing hooks and permitting removal or insertion of a selected fishing hook.

1. Description of the Prior Art

Many different devices have been developed to retain fishing hooks. One such device is a simple tube through which the leader line and loop is passed, so that tension of the leader line retains the hook and the loop at opposite ends of the tube, as disclosed in U.S. Pat. No. 4,866,875, issued to Bliven. A variant of this simple approach is disclosed in U.S. Pat. No. 4,977,700 to Perlman et al., which discloses a tube having slots at one end to retain the fishing hook. In Perlman et al., the leader line is trapped on the outside of the tube. Both U.S. Pat. No. 2,629,200, issued to Woodhead, and U.S. Pat. No. 2,927,395, issued to Bartlett, are variations upon this basic principle. Bartlett places a cover over the tube when hooks are attached to it, while Woodhead provides a sliding cap designed to lower onto the top of the tube where the fishing hooks are trapped, thereby further securing the fishing hooks. None of the disclosed prior art patents combine the security of the present invention with its economy of manufacture. Each requires mechanically complicated moving parts, and none provides optimal features of this invention, including the ability to remove a given hook while all other hooks are still fully secured, and the ability to secure the swivel ends of the hooks' leader lines and prevent their tangling.

SUMMARY OF THE INVENTION

A hook holder is disclosed of the type primarily intended for removably retaining a fishing hook. The hook holder includes receiving means including at least one opening therethrough for a hook and a generally central first portion, retaining means including a first and a second surface and a generally central second portion, the retaining means being placed adjacent to the hook receiving means so that the second surface is generally adjacent to the receiving means and the second portion is generally adjacent to the first portion, and means for fastening the retaining means to the receiving means, the means for fastening passing through the first and second portions, so that a hook is held in the opening by pressure from the retaining means when the retaining means is deformed by introduction of the hook between the retaining means and the receiving means.

As a result of the novel incorporation of retaining means into the present invention, the hook holder described herein securely retains multiple hooks and permits the removal of any given hook while preventing the other hooks secured from being dislodged.

The invention accordingly comprises an article of manufacture possessing the features, properties, and relation of elements which will be exemplified in the article of manufacture hereinafter described and the scope of the invention will be indicated in the claims.

BRIEF DESCRIPTION OF THE DRAWINGS

For a full understanding of the nature and objects of the invention, reference should be had to the following detailed description taken in connection with the accompanying drawings, in which.

Similar reference characters refer to similar parts throughout the several views of the drawings.

DETAILED DESCRIPTION

Figure 1:
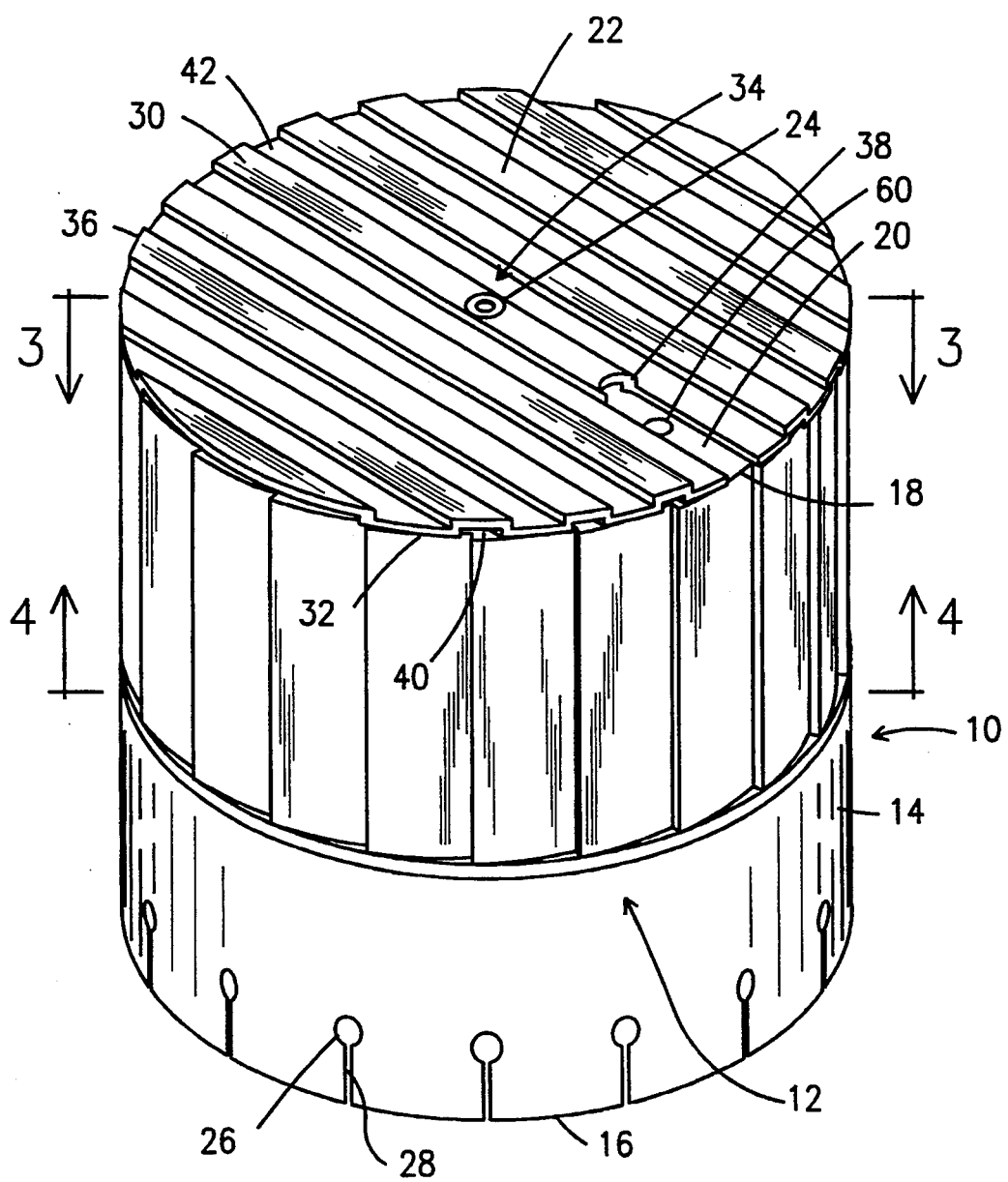
FIG. 1 is a perspective view of a hook holder according to the present invention.

FIG. 1 presents a perspective view of the hook holder according to the present invention. The hook holder, generally indicated as 10, comprises two principal parts, although it could suitably be composed of more parts. The first part, the cylindrical structure generally indicated as 12, comprises a wall 14, a bottom 16, and a top 18. Although a generally cylindrical structure 12 is described herein, this structure may be any suitable equivalent known to the art, including other structure shapes such as squares, pyramids, cones, ovoids, and other such shapes.

The wall 14 is defined at its extremities by the bottom 16 and the top 18. In a preferred embodiment, bottom 16 is open, and top 18 defines the shape of receiving means 20, which may conveniently be a firm surface shaped to the contours of top 18. Alternatively, receiving means 20 may be any surface known to the art and providing the requisite support conveniently including frames, grills, webs, or even semi-flexible or resilient surfaces.

Retaining means 22 is held adjacent to hook receiving means 20 by means 24 for fastening the retaining means 22 to the receiving means 20. At least one swivel opening 26 passing through wall 14 is disposed along the cylindrical structure 12 wall 14, generally toward the bottom 16. In a preferred embodiment, eight or more swivel openings 26 may conveniently be formed through wall 14. From each swivel opening 26 a slit 28 extends to the bottom 16. The slits 28 may conveniently be formed in wall 14 by cutting the material, but may also be formed during manufacture of cylindrical structure 12.

In a preferred embodiment, retaining means 22 may conveniently be formed of a sheet of material having a first surface 30 and a second surface 32 opposite the first surface 30. Disposed toward the middle of retaining means 22, which may conveniently be of a similar shape to top 18 of cylindrical structure 12, is a generally central second portion, generally indicated as 34. This generally central second portion is disposed in juxtaposed relation to the receiving means 20, so that the second surface 32 is generally adjacent to receiving means 20.

Retaining means 22 is defined by a perimeter 36 that may conveniently be of similar shape as top 18 of the cylindrical structure 12. In a preferred embodiment, a slot 38 extends generally toward second portion 34 from perimeter 36. The slot 38 may conveniently serve the purposes described later in this detailed description. Retaining means 22 may conveniently comprise means 40 for resisting rotation of the retaining means 22 relative to the receiving means 20.

Means 40 for resisting rotation may suitably be multiple grooves 40 formed in the second surface 32, achieved conveniently by corrugating the sheet from which the retaining means 22 is formed. If such corrugation is employed, grooves 42 may likewise be formed in the first surface 30 of retaining means 22.

A fishing hook, generally indicated as 44, typically has a curved body 46 or curved shaft 46 leading to a point 48 at one end and to means 50 for fastening the leader line 52 thereto. Leader line 52 may conveniently have a first end 56 attached to means 50 for fastening the leader line, and may have a second end 58 attached to the swivel 54. The swivel 54 can be placed in the swivel opening 26 by passing it through the slit 28, and can likewise be removed from the swivel opening 26 by passage through slit 28 in a direction toward bottom 16 of the cylindrical structure 12.

Figure 2:
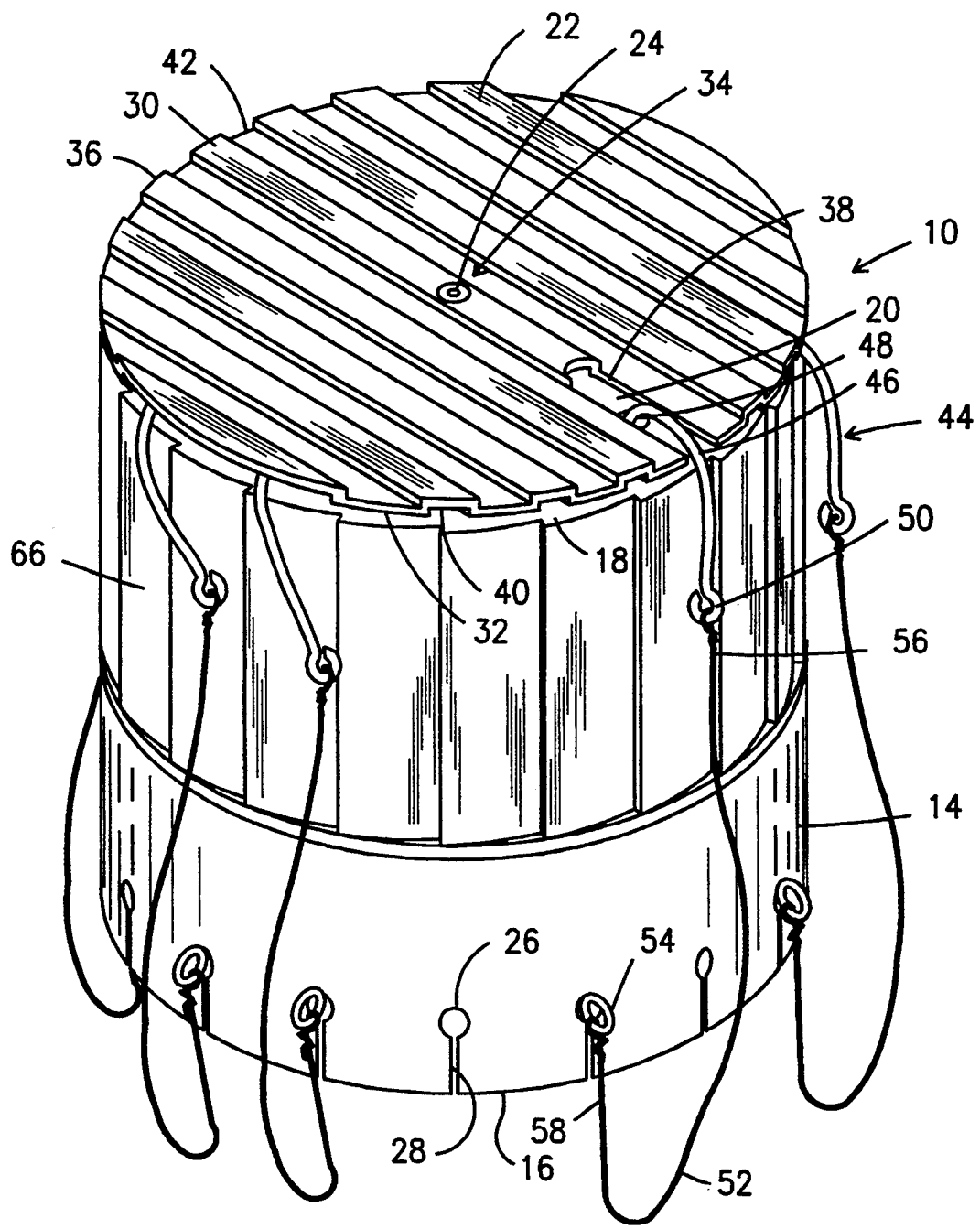
FIG. 2 is a perspective view of the hook holder of FIG. 1, showing hooks attached.

As can be seen in FIG. 2, the hook 44 is retained in the hook holder 10 of the present invention by deforming retaining means 22 and fitting the curved body 46 of hook 44 between the deformed retaining means 22 and the receiving means 20.

Figure 3:
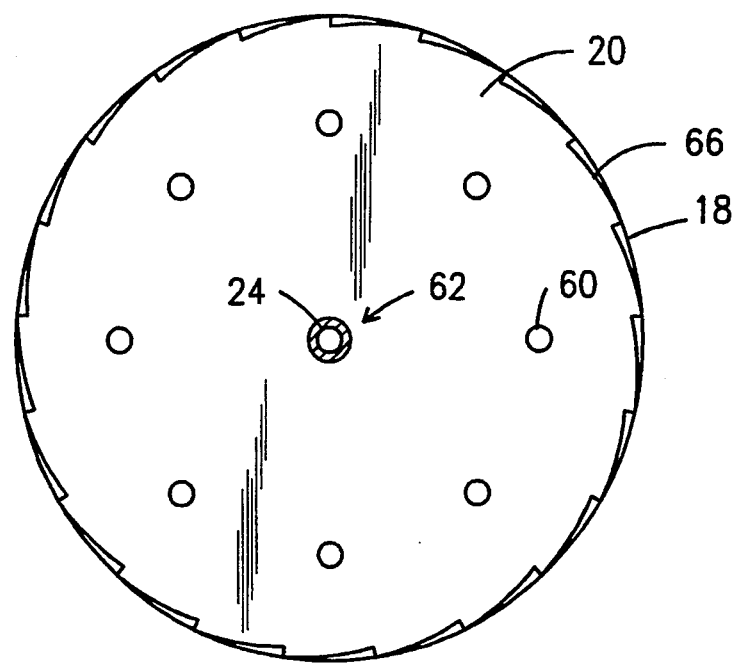
FIG. 3 is a top sectional view taken along line 3—3 of FIG. 1, depicting the receiving means of the present invention.

In FIG. 3, which is a sectional view of the hook holder 10 of the present invention taken along line 3—3 of FIG. 1, a clear view of the receiving means 20 is presented. A plurality of openings 60 are formed through the receiving means, which is defined by the top 18 of the cylindrical structure 12. Disposed generally toward the middle of receiving means 20 is a generally central first portion, generally indicated as 62. In a preferred embodiment, that portion of the wall 14 of the cylindrical structure 12 proximal to the receiving means 20 may have vertical teeth 66 formed in it for resisting rotation in a clockwise direction as seen from above in FIG. 3. Although this presents the advantage of preventing slippage of hooks 44, it is not essential to the present invention that such teeth 66 be present, and such teeth 66 can be substituted with any means for preventing hook movement known to the art.

The number of openings 60 formed through receiving means 20 may conveniently match the number of swivel openings 26.

As can be seen from FIGS. 1 and 3, the means 24 for fastening the retaining means 22 to the receiving means 20 may conveniently pass through the first portion 62 and the second portion 34 in such a fashion that the second surface 32 is held adjacent to the receiving means 20, and the second portion 34 is generally adjacent to the first portion 62. In a preferred embodiment, means 24 for fastening permits rotation of the retaining means 22 relative to the receiving means 20. Means 24 for rotatably fastening may conveniently be a rivet, a bolt and nut, a nail or other means known to the art.

As stated above, the means 24 for rotatably fastening may permit rotation of the retaining means 22 relative to the receiver means 20. This permits the slot 38 in the retaining means 22 to be positioned above any particular opening 60, permitting insertion of a hook 44, or removal of a hook 44 that had been retained in opening 60. When a hook 44 is introduced between retaining means 22 and receiving means 20, particularly when retaining means 22 is of a resilient material and is therefore deformed by that introduction, then the hook 44 is held in the opening 60 by pressure from the retaining means 22. The means 40 for resisting rotation operates to prevent such rotation in this preferred embodiment because the grooves 40 on the second surface 32 engage the curved body 46 of the hooks 44 when the retaining means 22 is deformed, and the hooks 44 may conveniently engage the vertical teeth 66 in their turn.

All parts of the present invention may suitably be constructed from plastic using any well known method of molding and shaping. Other suitable materials might include metal, wood, and any other material known in the art to have sufficient strength and durability for the purposes of the present invention. In a preferred embodiment, retaining means 22 is formed of a resilient material such as a resilient plastic, which is capable of being repeatedly deformed and returning to its original shape and position, and which is capable of applying pressure on the hooks 44 when so deformed.

Figure 4:
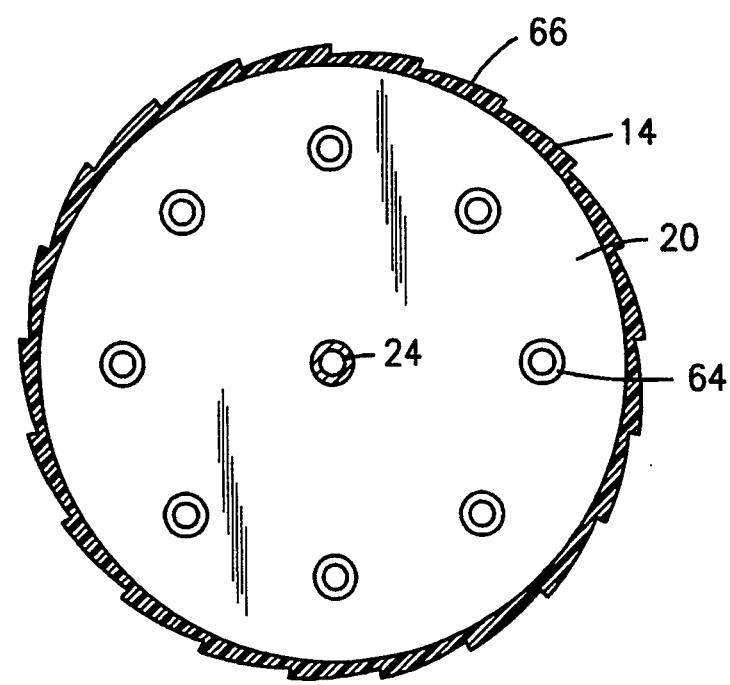
FIG. 4 is a sectional view of the hook holder of FIG. 1 taken along line 4—4, depicting the underside of the receiving means of the present invention.

To prevent the points 48 of the hooks 44 from catching on the underside of the openings 60, a short tube 64 having an inner diameter of the same diameter as the opening 60 may conveniently be attached to the underside of the receiving means 20. This prevents the point 48 from encountering the edge of opening 60 when the hook 44 is being removed. This can clearly be seen in FIG. 4, a cross-sectional view of the hook holder 10 of FIG. 1 taken along line 4—4.

It will thus be seen that the objects set forth above among those made apparent from the proceeding description are efficiently obtained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A hook holder of the type primarily intended for removably retaining a fishing hook, said hook holder comprising:

hook receiving means comprising at least one opening formed therethrough for receiving the hook therein, said receiving means further comprising a generally central first portion;

retaining means comprising a first surface, a second surface, and a generally central second portion disposed in juxtaposed relation to said receiving means such that said second surface is generally adjacent said receiving means and said second portion is generally adjacent said first portion; and means for fastening said retaining means to said receiving means, said means for fastening passing through said first and second portions, whereby said hook is held in said at least one opening by pressure from said retaining means when said retaining means is deformed by introduction of said hook between said retaining means and said receiving means.

2. The hook holder of claim 1 wherein said means for fastening comprises means for rotatably fastening, whereby said retaining means and said receiving means may be rotated with respect to each other about said means for fastening.

3. The hook holder of claim 2 wherein said retaining means has a perimeter and a slot extending generally toward said second portion from said perimeter, whereby said slot may be rotated to lie above said at least one opening and to permit easy removal or insertion s of said hook.

4. The hook holder of claim 3 further comprising means for resisting rotation of said retaining means relative to said receiving means.

5. The hook holder of claim 4 further comprising a generally cylindrical structure comprising a wall, a bottom and a top, said wall being defined at its extremities by said bottom and said top, said bottom being open, said top defining said receiving means.

6. The hook holder of claim 5 further comprising:
at least one swivel opening through said wall;
at least one slit in said wall, said slit extending from said swivel opening to said bottom; and wherein said hook has an attached leader line, said leader line comprising a first end attached to said hook and a second end attached to a swivel, whereby said swivel can be placed in said swivel opening by passage through said slit to secure said leader line, and whereby said swivel can be removed from said swivel opening by passage through said slit.

7. The hook holder of claim 6 wherein said means for resisting rotation of said retaining means relative to said receiving means comprises at least one groove on said second surface, such that said hook engages said groove during rotation of said retaining means relative to said receiving means resulting in resistance to said rotation; and said means for rotatably fastening said retaining surface to said resilient rotatable surface comprises a rivet.

8. The hook holder of claim 7 wherein said at least one opening comprises a plurality of openings formed therethrough, each for receiving the hook therein.

* * * * *

UNITED STATES PATENT AND TRADEMARK OFFICE
CERTIFICATE OF CORRECTION

PATENT NO. : 5,440,829
DATED : AUG 15, 1995
INVENTOR(S) : KENNETH PARVIN

It is certified that error appears in the above-indentified patent and that said Letters Patent is hereby corrected as shown below:

In the Claims:

Claim 3, column 5, line 6, delete the letter "s" before the word "of".

Signed and Sealed this

Twenty-third Day of July, 1996

Attest:

BRUCE LEHMAN

Attesting Officer  Commissioner of Patents and Trademarks